Figure 1:
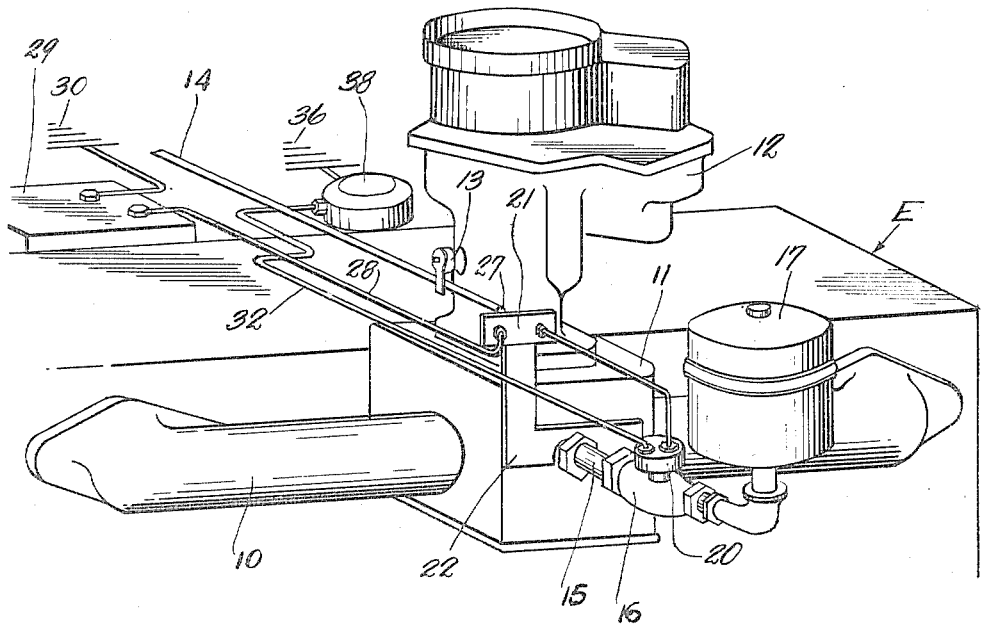

May 30, 1950     J. J. BALDINE     2,509,755

DEVICE FOR INTERNAL-COMBUSTION ENGINES

Filed Aug. 29, 1946

JOSEPH J. BALDINE
INVENTOR

BY *Michael Williams*
ATTORNEY

Patented May 30, 1950

2,509,755

UNITED STATES PATENT OFFICE 2,509,755

DEVICE FOR INTERNAL-COMBUSTION ENGINES

Joseph J. Baldine, Hubbard, Ohio

Application August 29, 1946, Serial No. 693,662

1 Claim. (Cl. 123—124)

My invention relates to devices for use with an internal combustion engine, more particularly to such devices which admit atmospheric air to the intake manifold of the engine when the carburetor controls of the engine are in engine-idling position but the engine is operating above idling speed.

The invention is particularly useful as a means for saving gasoline, but it is equally useful, among other things, as a means of preventing the fouling of engine parts, particularly the spark plugs, and preventing dilution of the engine oil in the crank-case.

When an automobile is driven along the road and its speed tends to exceed the speed of the engine, the compression of the engine acts as a brake, and this is a desirable feature, particularly when driving down hill. However, when the speed of the engine exceeds the speed for which the carburetor controls are adjusted, the engine develops a pumping action, producing a high vacuum which draws a rich mixture of gasoline and air from the carburetor into the engine cylinders. This mixture is too rich for complete combustion, and as a result a cloud of noxious gases and vapors are expelled from the engine cylinders and to atmosphere through the exhaust pipe. This is particularly noticeable when an automobile is going down hill, using its engine as a partial braking medium.

To circumvent this condition, "free-wheeling" was incorporated in automobiles, but this was found undesirable, since braking action of the engine was eliminated and excessive wear on the brakes resulted.

The prior art also shows devices for admitting air to the intake manifold of the engine when the engine is "coasting," but these devices have not met with commercial success because of their complicated nature and/or because of their unreliability.

My invention provides a device which is simple in operation and inexpensive to manufacture. Further, my invention provides a device which prevents stalling of the engine when the carburetor controls and the engine are at idling speed.

Figure 2:
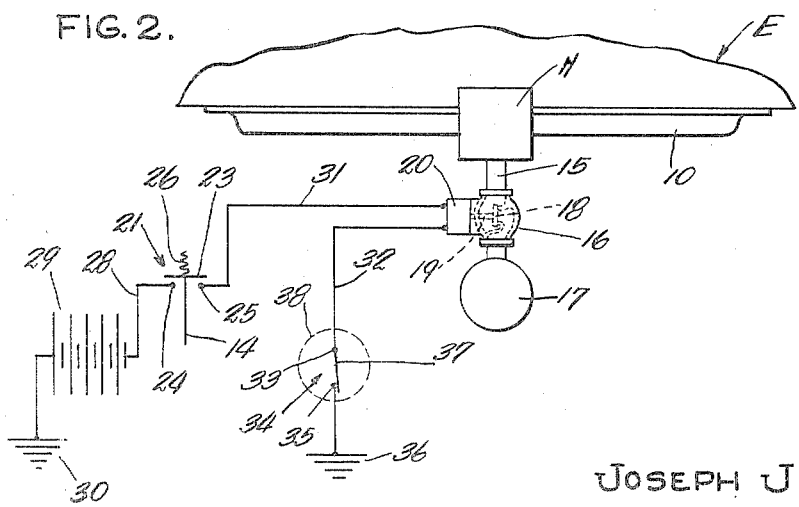

Referring to the drawing accompanying this specification and forming part of this application, there is shown, for purposes of illustration, an embodiment which my invention may assume, and in this drawing:

Figure 1 is a generally schematic perspective view illustrating an embodiment of my invention as applied to an internal combustion engine, and Figure 2 is a diagrammatic representation of the electrical wiring of the embodiment shown in Figure 1.

Referring to the drawing, the internal combustion engine E to which the embodiment of the invention herein disclosed is applied, is provided with the usual intake manifold 10. Attached to the intake box 11 of the intake manifold is the usual carburetor 12 which, as is customary, mixes air and gasoline for passage to the intake manifold 10. The carburetor 12 has the usual throttle control 13, to which is connected the accelerator rod 14.

All of the foregoing construction is well known and does not in itself form part of my invention; accordingly, detailed description thereof is believed unnecessary.

Leading into the intake box 11 of the intake manifold 10 is a pipe 15, for supplying air to the intake manifold independently of the carburetor. Passage of air through the pipe 15 is controlled by a valve 16 which may be of standard construction, the intake port of the valve 16 communicating with an air cleaner 17, which also may be of standard construction. It will be appreciated that the air cleaner 17 filters the air passing to the intake manifold 10.

The valve member 18 of the valve 16 is attached for movement with the solenoid plunger 19 of a solenoid 20. The valve 16 may be of the standard type wherein its valve member 18 is spring pressed to its position blocking passage of air through the valve. It will be understood that the valve member 18 may be urged to its closed position in any other suitable manner, the described manner being only for purposes of illustration.

The solenoid 20 herein disclosed is so designed that when it is energized it will unseat the valve member 18 so as to provide for flow of air from the air cleaner 17 to the interior of the intake manifold 10.

An electrical switch 21 is rigidly attached to a part of the engine E, as for instance by a bracket 22 carried by the intake box 11. The switch 21 comprises a bridging plate 23 and a pair of contacts 24, 25, and a spring 26 normally urges the bridging plate to engagement with the contacts.

Engagement between the bridging plate 23 and the contacts 24, 25 is broken by movement of the accelerator rod 14, and one method of achieving this result is, as herein shown, to position the extremity 27 of the accelerator rod in spaced relation from the contact with a push button (not shown) carried by the bridging plate when the engine is idling, but in position to engage such push button and remove the bridging plate from engagement with the contacts 24, 25 when the accelerator rod is moved to set the throttle control 13 above engine-idling speed.

The contact 24 is connected, by conductor 28, to one end of a battery 29, which may be the automobile battery, the other end of the battery being grounded, as shown at 30.

The contact 25 is connected, by conductor 31, to one terminal of the solenoid 20, the other terminal being connected, by conductor 32, to a contact 33 of an electrical switch 34, the other contact 35 of the switch being grounded, as at 36. The switch 34 includes a bridging arm 37 which is actuated by a governor device 38 of any well-known standard make. The governor device 38 is driven according to the speed of the engine, and conveniently, the governor device may be connected for rotation with the shaft of the electrical distributor of the engine E.

The governor device 38 is so constructed and arranged that it moves the bridging arm 37 to bridge the contacts 33, 35 when the engine E is operating above idling speed, but to break engagement with the contacts 33, 35 when the engine is at idling speed.

In operation, when the driver of the automobile accelerates the engine, the accelerator rod 14 moves the bridging plate 23 from engagement with the contacts 24, 25, thus breaking electrical circuit to the solenoid 20. When the engine E gets above idling speed, the governor 38 will move the bridging arm 37 to position wherein it bridges the contacts 33, 35 so that this part of the electrical circuit is in position to pass electrical current.

When the driver of the automobile releases the accelerator pedal, such as when coasting with the engine engaged, or when going down hill using the engine as a partial brake, the extremity 27 of the accelerator rod 14 is withdrawn sufficiently so that the spring 26 urges the bridging plate 23 of the switch 21 into engagement with the contacts 24, 25.

Since the engine E is operating above idling speed, the governor device 38 is holding the bridge arm 37 of the switch 34 into engagement with the contacts 33, 35. Thus, with the electrical switches 21 and 34 in "closed" relation, an electrical circuit is established to energize the solenoid 20.

Energization of the solenoid 20 causes its plunger to move the valve member 18 away from its seat, so as to provide for flow of air from the atmosphere, through the air cleaner 17, the valve 16, the pipe 15, and to the interior of the intake manifold 10.

Atmospheric air is drawn in by the vacuous condition existing within the intake manifold, and this air relieves the vacuum and prevents a gasoline mixture from being drawn from the carburetor. Therefore, on a "coast" with the engine engaged, atmospheric air, independent of the carburetor supply, is drawn into the intake manifold.

When the engine reaches idling speed, the governor device 38 automatically disengages the bridge arm 37 from bridging contact with the contacts 33, 35, so that the solenoid is deenergized to permit the valve member 18 to close off flow of air through the valve 16, and combustible mixture is again supplied by the carburetor to keep the engine from stalling.

By use of my invention, standard, time-tested, and inexpensive parts may be used in a simple combination which is readily attached to an internal combustion engine with little skill and effort.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

The combination with an accelerator rod controlled internal combustion engine having an intake manifold provided with a supplemental air feed controlled by a solenoid operated valve in an electrical circuit having a normally open switch and normally closed switch, of means driven by the electrical distributor of the engine to close the normally open switch when the engine is operated above idling speed, said normally closed switch including a spring biased bridging plate across spaced contacts in the circuit, and means for mounting said bridging contact in alinement with and normally spaced from an extremity of the accelerator rod of the engine whereby upon longitudinal movement of the rod to accelerate the engine above idling speed the normally closed switch is opened against spring pressure by the end engagement of the accelerator rod with the bridging contact.

JOSEPH J. BALDINE.

REFERENCES CITED

The following references are of record in the file of this patent:

UNITED STATES PATENTS

| Number | Name | Date |
| --- | --- | --- |
| 1,918,913 | Isdahl | July 18, 1933 |
| 2,022,094 | Shoemaker et al. | Nov. 26, 1935 |
| 2,035,755 | Vander Veer | Mar. 31, 1936 |